(12) United States Patent
Papili et al.

(10) Patent No.: US 9,596,595 B2
(45) Date of Patent: *Mar. 14, 2017

(54) INTEGRATED NUMBER MANAGEMENT MODULE AND SERVICE ORDER SYSTEM

(71) Applicant: Accenture Global Services Limited, Dublin (IE)

(72) Inventors: Marina Papili, Milan (IT); Chiara Cundari, Pisa (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 52 days.

This patent is subject to a terminal disclaimer.

(21) Appl. No.: 14/163,875

(22) Filed: Jan. 24, 2014

(65) Prior Publication Data

US 2014/0141764 A1 May 22, 2014

Related U.S. Application Data

(62) Division of application No. 11/810,880, filed on Jun. 7, 2007, now Pat. No. 8,676,745.

(30) Foreign Application Priority Data

Dec. 29, 2006 (EP) ..................................... 06127340
Dec. 29, 2006 (IT) .............................. MI2006A2534

(51) Int. Cl.
*G06F 7/00* (2006.01)
*G06F 17/30* (2006.01)
(Continued)

(52) U.S. Cl.
CPC .......... *H04W 8/245* (2013.01); *G06Q 10/087* (2013.01); *G06Q 50/32* (2013.01); *H04W 8/26* (2013.01); *G06Q 10/10* (2013.01)

(58) Field of Classification Search
CPC ......... G06F 17/30115; G06F 17/30581; G06F 7/00; G06F 17/00; H04W 8/26; H04W 8/245; G06Q 10/10; G06Q 10/087
(Continued)

(56) References Cited

U.S. PATENT DOCUMENTS 5,887,253 A * 3/1999 O'Neil .................. H04W 8/265
455/410
6,014,561 A * 1/2000 Molne ................... H04W 48/18
455/419
(Continued)

FOREIGN PATENT DOCUMENTS

EP         1652399 B1    3/2011
EP         2045959       7/2011
WO         01/73625 A1   10/2001

*Primary Examiner* — Daniel Kuddus
(74) *Attorney, Agent, or Firm* — Brinks Gilson & Lione

(57) ABSTRACT

A number inventory system is disclosed. The number inventory system manages the relationships between SIM cards, IMSI numbers, and MSISDN for a mobile telecommunications service provider. The number inventory system provides the software and hardware for receiving SIM card inventory data, including associated IMSI numbers, and efficiently stores the SIM card inventory data in a database. The number inventory system further provides for the opening of a range of available MSISDN. SIM cards, IMSI and MSISDN may be assigned to customer orders, and the number inventory system manages the associations between IMSI numbers and MSISDN and monitors the status of SIM cards, IMSI numbers and MSISDN. The number inventory system may also manage an MSISDN classification system for identifying MSISDN numbers having various desirable sequence characteristics.

17 Claims, 18 Drawing Sheets

(51) Int. Cl.
*H04W 8/24* (2009.01)
*G06Q 10/08* (2012.01)
*G06Q 50/32* (2012.01)
*H04W 8/26* (2009.01)
*G06Q 10/10* (2012.01)

(58) Field of Classification Search
USPC .................................. 707/601, 621, 999.105
See application file for complete search history.

(56) References Cited

U.S. PATENT DOCUMENTS

| | | | | |
|---|---|---|---|---|
| 6,199,161 B1* | 3/2001 | Ahvenainen | .......... | H04W 12/04 380/278 |
| 6,212,372 B1* | 4/2001 | Julin | ..................... | H04M 15/00 340/5.2 |
| 6,934,534 B1* | 8/2005 | Roy | .................. | H04L 29/06027 455/414.1 |
| 7,505,786 B2* | 3/2009 | Wennberg | ............... | H04W 8/18 455/556.1 |
| 2003/0032409 A1* | 2/2003 | Hutcheson | ............. | G06Q 30/02 455/414.1 |
| 2003/0172145 A1* | 9/2003 | Nguyen | ................. | G06Q 10/10 709/223 |
| 2004/0193645 A1* | 9/2004 | Cuckson | ............. | G06Q 20/203 |
| 2004/0200895 A1 | 10/2004 | Boyce et al. | | |
| 2007/0076760 A1* | 4/2007 | Wennberg | ............. | H04W 8/205 370/477 |
| 2008/0256020 A1* | 10/2008 | Wakefield | ......... | H04L 29/12169 |
| 2008/0256027 A1 | 10/2008 | Kruger et al. | | |
| 2008/0258351 A1* | 10/2008 | Shieh | .................... | D01D 5/0092 264/466 |
| 2008/0293408 A1* | 11/2008 | Jiang | ..................... | H04W 8/183 455/433 |
| 2008/0298351 A1* | 12/2008 | Buckley et al. | .............. | 370/355 |
| 2010/0291907 A1* | 11/2010 | MacNaughtan | ... | G06Q 30/0241 455/414.1 |
| 2011/0053580 A1* | 3/2011 | Gutierrez | ................ | H04W 8/18 455/418 |

* cited by examiner

```
************************************
*        HEADER DESCRIPTION         *
************************************
Customer:          BTC MOBILE
Batch:             00001
Quantity:          00005
Card_Type:         00
Electrical_profile: 01.00
Graph_profile:     01.00
Transport_key:     001
*
Address1:          2 Yavorov Blvd
Address2:          TV Tower
Address3:          Sofia 1080
Address4:          Bulgaria
*
Vendor_code:       01
Price_Plan:        01
PO_ref_number:     ABCDE00001
************************************
*         INPUT VARIABLES           *
************************************
Var_in_list:
ICCID:             22210000000000020000
IMSIa:             22210000000020000
IMSIb:             22210000000021000
************************************
*         OUTPUT VARIABLES          *
************************************
*var_out:ICCID-20  MSISDN-12  IMSI1-15  IMSI2-15  ACCESS-4  PIN1 PUK1-8  PIN2 PUK2-8  ADM1-16  KI-32  OTA1-16  OTA2-16  OTA3-16
```
{1302}

1304: 22210000000020000 1234567890ABCDEF 222100000000020000 222100000020000 ABCDEF 9985 87749985 9985 87749985 1234567890ABCDEF 1234567890ABCDEF 0007 1234567890ABCDEF 22210000000000020000 00000000000020000

1306: 22210000000020001 1234567890ABCDEF 222100000000020001 222100000020001 ABCDEF 9985 87749985 9985 87749985 1234567890ABCDEF 1234567890ABCDEF 0007 1234567890ABCDEF 22210000000000020001 00000000000020001

1308: 22210000000020002 1234567890ABCDEF 222100000000020002 222100000020002 ABCDEF 9985 87749985 9985 87749985 1234567890ABCDEF 1234567890ABCDEF 0007 1234567890ABCDEF 22210000000000020002 00000000000020002

1310: 22210000000020003 1234567890ABCDEF 222100000000020003 222100000020003 ABCDEF 9985 87749985 9985 87749985 1234567890ABCDEF 1234567890ABCDEF 0007 1234567890ABCDEF 22210000000000020003 00000000000020003

1312: 22210000000020004 1234567890ABCDEF 222100000000020004 222100000020004 ABCDEF 9985 87749985 9985 87749985 1234567890ABCDEF 1234567890ABCDEF 0007 1234567890ABCDEF 22210000000000020004 00000000000020004

22210000000020005 1234567890ABCDEF 222100000000020005 222100000020005 ABCDEF 9985 87749985 9985 87749985 1234567890ABCDEF

Fig. 13

```
***********************
*  HEADER DESCRIPTION
***********************
Customer:          BTC MOBILE
Batch:             00001
Quantity:          00005
Card_Type: 00
Electrical_profile: 02.00
Graph_profile:     01.00
Transport_key:     001
*
Address1:          2 Yavorov Blvd
Address2:          TV Tower
Address3:          Sofia 1080
Address4:          Bulgaria
*
Vendor_code:       01
Price_Plan:        01
PO_ref_number:     ABCDE00001
***********************
*   INPUT VARIABLES
***********************
Var_in_list:
ICCID:             8935903000000000000
IMSIa:             284030000000000
IMSIb:             444010000000000
***********************
*   OUTPUT VARIABLES
***********************
*var_out:ICCID-20  MSISDN-12  ACCESS-4  IMSI1-15         IMSI2-15         PIN1 PUK1-8 PIN2 PUK2-8 ADM1-16           4  KI-32                             OTA1-16                           OTA2-16                           OTA3-16
ADM2-16                           ADM3-16
22210000000000020000 893400003000 222100000022000 222100000021000 9985 87749985 9985 87749985 1234567890ABCDEF 0007 1234567890ABCDEF 22210000000000000000000020000
1234567890ABCDEF 1234567890ABCDEF
22210000000000020001 893400003001 222100000022001 222100000021001 9985 87749985 9985 87749985 1234567890ABCDEF 0007 1234567890ABCDEF 22210000000000000000000020001
1234567890ABCDEF 1234567890ABCDEF
22210000000000020002 893400003002 222100000022002 222100000021002 9985 87749985 9985 87749985 1234567890ABCDEF 0007 1234567890ABCDEF 22210000000000000000000020002
1234567890ABCDEF 1234567890ABCDEF
22210000000000020003 893400003003 222100000022003 222100000021003 9985 87749985 9985 87749985 1234567890ABCDEF 0007 1234567890ABCDEF 22210000000000000000000020003
1234567890ABCDEF 1234567890ABCDEF
22210000000000020004 893400003004 222100000022004 222100000021004 9985 87749985 9985 87749985 1234567890ABCDEF 0007 1234567890ABCDEF 22210000000000000000000020004
1234567890ABCDEF 1234567890ABCDEF
```

Fig. 14

INTEGRATED NUMBER MANAGEMENT MODULE AND SERVICE ORDER SYSTEM

PRIORITY CLAIM

This application is a divisional application of U.S. patent application Ser. No. 11/810,880, filed Jun. 7, 2007, which claims the benefit of EPO Application No. 06127340.5, filed Dec. 29, 2006 and Italian Application No. MI2006A002534, filed Dec. 29, 2006, each of which is incorporated herein by reference in its entirety.

BACKGROUND OF THE INVENTION

Technical Field

This disclosure relates to a system for managing a telecommunications service provider's inventory of SIM cards, IMSI numbers and MSISDN.

Background Information

FIG. 1 shows a typical mobile telephone 102. Every mobile telephone includes a smart card 104 that contains an embedded integrated circuit chip (ICC). The ICC is configured to execute a software application program known as a subscriber identity module (SIM). The SIM provides secure data storage for key data identifying a mobile telephone service subscriber and associated subscription information. Together an ICC executing a SIM application may be simply referred to as a SIM card.

There are several important numbers associated with a SIM card. An ICC code 110 is a numeric (or alphanumeric) code printed directly on an ICC card. The ICC code serves as a unique identifier of a physical card. An international mobile subscriber identity number 106 (IMSI number) is a unique number stored within a SIM application. The IMSI number is a unique number associated with all GSM and UMTS network mobile phone users. The IMSI number identifies the mobile phone to the mobile telephone network in which the mobile phone operates. A Mobile Subscriber ISDN (MSISDN) 108 is also associated with a SIM card. The MSISDN corresponds to the actual telephone number of the mobile telephone in which the SIM card is installed.

A mobile telecommunication service subscriber's MSISDN 108 must be associated with the IMSI number 106 stored in the subscriber's SIM card by the network in order for the network to properly direct calls to the subscriber's mobile telephone. A mobile telephone service provider (telecom) might have hundreds of thousands or even millions of subscribers. New subscribers may be added every day and existing subscribers may drop or alter their subscription packages. Given the scale of most telecoms' customer bases, monitoring a telecom's inventory of available SIM cards, IMSI numbers, and MSISDN, as well as managing the associations between IMSI numbers and MSISDN for new and existing subscribers can be a complex and burdensome task.

SUMMARY

The present disclosure relates to a number inventory system. The number inventory system manages the relationships between a mobile telephone user's SIM card, the IMSI number or IMSI numbers stored on the SIM card, and the user's MSISDN. The number inventory module may be built on top of a customer relationship management or customer care system. The number inventory module provides functionalities for receiving SIM card inventory data, including associated IMSI numbers, and efficiently storing the SIM card inventory data in a database. The number inventory system further provides for the opening of a range of available MSISDN. SIM cards, IMSI and MSISDN may be assigned to customer orders. The number inventory system manages the associations between IMSI numbers and MSISDN and monitors the status of SIM cards, IMSI numbers and MSISDN. The number inventory system may also manage an MSISDN classification system for identifying MSISDN numbers having various desirable numeric characteristics.

According to an embodiment a number inventory system includes a number inventory database. The number inventory database includes database tables for storing SIM card and other number inventory data. A database server is provided for interacting with the number inventory database. The database server stores number inventory data in the number inventory database and accesses number inventory data from the number inventory database. A web server generates number inventory interface pages that are displayed on a web client. The number inventory interface pages allow users to interact with the number inventory system. The web client displays the number inventory interface pages generated by the web server, and communicates user input to the web server. A gateway server communicates data and commands between the web server and the database server.

According to another aspect, a number inventory system manages the associations between SIM cards, IMSI numbers and MSISDN within a customer care system. The customer care system is adapted to, among other things, process customer orders for telecommunications products. The customer care system includes a customer care database and a customer care database server adapted to store customer care data in and retrieve customer care data from the customer care database. A web client is provided for displaying a graphical user interface and a web server is provided to serve interface pages to the web client. Web server extensions within the web server allow a user to interact with a number inventory software module. A gateway server is provided to communicate data and commands between the web server and the customer care database server. The customer care database server is adapted to execute the number inventory software module. The number inventory software module is adapted to store data in and extract data from a plurality of number inventory database tables within the customer care database.

In another aspect, a SIM card and number inventory management system provides a batch loading module adapted to load and store SIM card inventory data. A number management module is adapted to manage IMSI numbers associated with SIM cards and MSISDN numbers, and an order integration module is provided to interact with an order processing system. The order integration module associates SIM card data and MSISDN with mobile telecommunication product instances.

A method of managing IMSI numbers and MSISDN is also provided. The method includes defining a plurality of SIM card and MSISDN parameters. A range of available MSISDN and a range of available IMSI numbers associated with a batch of available SIM cards are defined. SIM card data are received and stored in a logical HLR. The received SIM card data correspond to the previously defined SIM card and MSISDN parameters. Once the MSISDN and IMSI number ranges have been established, MSISDN and an IMSI numbers are assigned to particular telecommunications product instances. When MSISDN and IMSI numbers are assigned to product instances, the method further includes changing state data associated with the assigned MSISDN and the assigned IMSI number.

Another aspect relates to a method of managing MSISDN and IMSI numbers associated with post-activated SIM cards. In this regard, a method of managing IMSI numbers and MSISDN includes creating a logical HLR in a number inventory database, opening a range of MSISDN within the logical HLR and opening a range of IMSI numbers within the logical HLR. The range of IMSI numbers may correspond to IMSI numbers stored on the individual SIM cards of a batch of received SIM cards. Next the method includes receiving data associated with the batch of SIM cards. The received data include the IMSI numbers associated with the individual SIM cards. Receiving an order for a post-activated mobile telecommunications product triggers the selection of an available SIM card for fulfilling the order. The selected SIM card stores an associated IMSI number. Fulfilling the order further includes selecting an MSISDN to be associated with the post-activated telecommunications product. The MSISDN may be selected from the opened range of MSISDN. Finally, the method of managing MSISDN and IMSI numbers associated with post-activated SIM cards includes changing state data associated with the selected MSISDN and the IMSI number associated with the selected SIM card. The altered state data indicate that the MSISDN and the IMSI number associated with the selected SIM card have been assigned to a particular product instance.

Yet another aspect relates to a method of managing MSISDN and IMSI numbers associated with pre-activated SIM cards. This method includes creating a logical HLR in a number inventory database, and opening both a range of MSISDN and a range of IMSI numbers within the logical HLR. The method further includes receiving data associated with a batch of pre-activated SIM cards. The individual SIM cards store both an IMSI number and an MSISDN. The method next calls for storing the IMSI numbers and MSISDN stored on individual SIM cards in the logical HLR, and storing an association between the IMSI numbers and MSISDN stored on the same SIM cards. Finally, the method calls for creating dummy data structures corresponding to the individual SIM cards. A telecommunications product comprising the pre-activated SIM cards and corresponding dummy data structures defines a salable telecommunications asset.

Other systems, methods, features and advantages will be, or will become, apparent to those with skill in the art upon examination of the following figures and detailed description. It is intended that all such additional systems, methods, features and advantages be included within this description, and be protected by the following claims.

BRIEF DESCRIPTION OF THE DRAWINGS

FIG. 13 is an example of a manufacturer file for post-activated SIM cards.

FIG. 14 is an example of a manufacturer file for pre-activated SIM cards.

DETAILED DESCRIPTION

Figure 1:
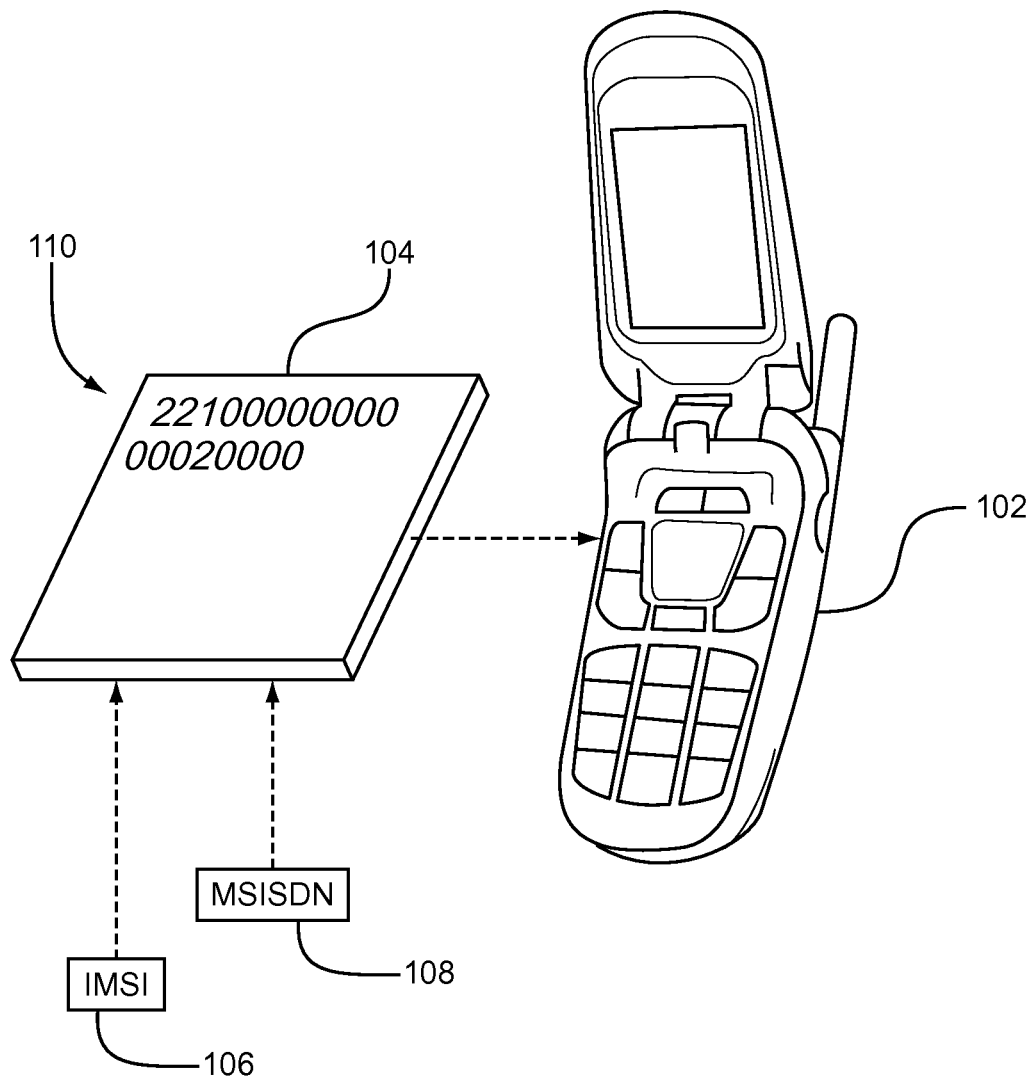
FIG. 1 shows a typical mobile telephone with an associated SIM card having an IMSI number and MSISDN stored thereon.
Figure 2:
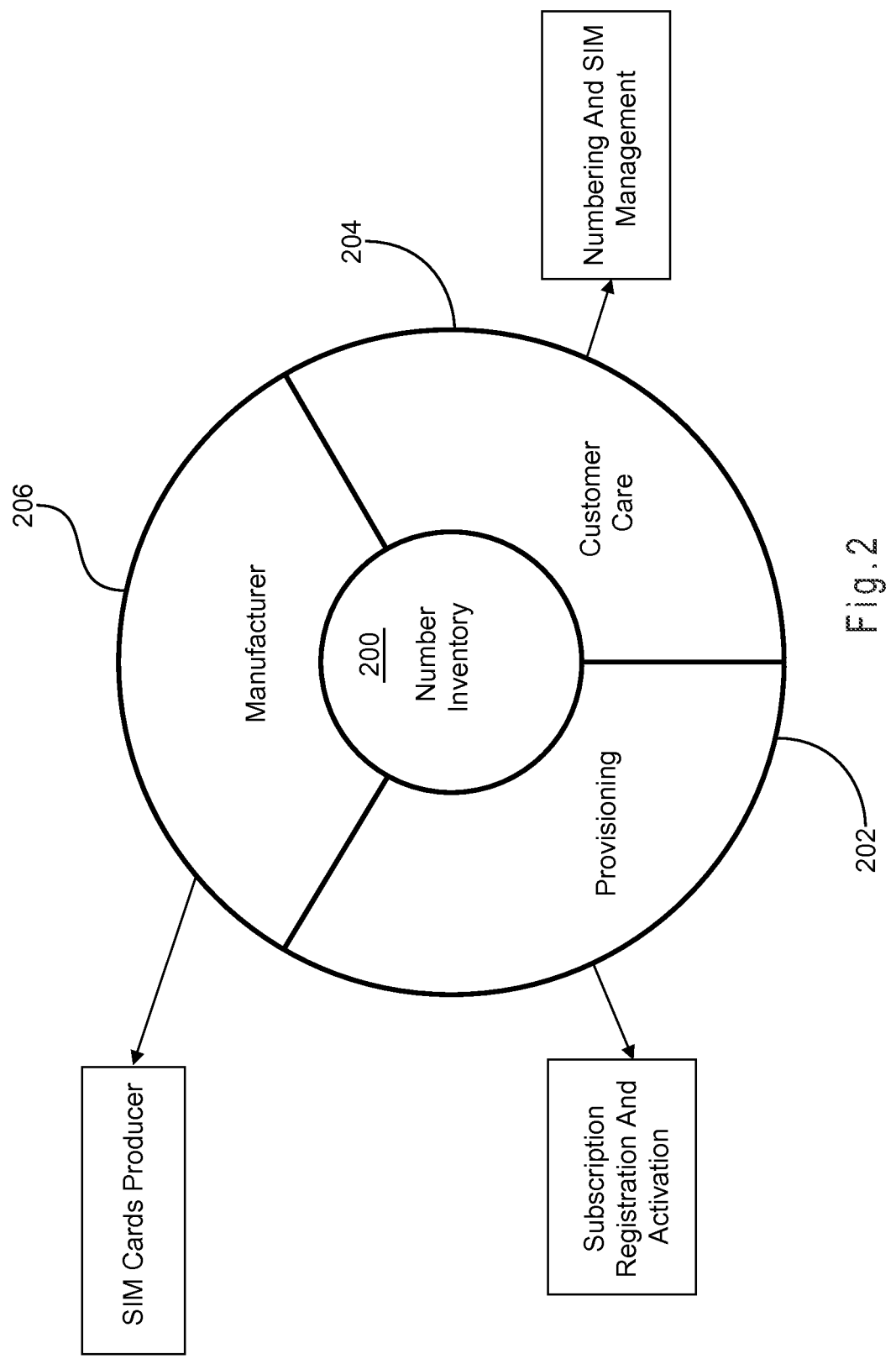
FIG. 2 is a diagram showing the various external systems impacted by the number inventory system.

A number inventory management system is provided. The number inventory management system impacts and is affected by a number of distinct information systems related to providing telecommunications services to customers. As shown in FIG. 2, a number inventory module 200 interacts with a telecom's provisioning system 202 and customer care system 204. The number inventory module also interacts with the external information systems of third party suppliers or manufacturers of SIM cards 206. The number inventory module 200 impacts the provisioning system as it relates to subscription registration, service activation, service modification, or cancellation.

The number inventory module impacts the customer care system in response to processing orders for new subscriptions, or modifications to existing customer service subscriptions. In order to process orders efficiently and establish new service subscriptions and process subscription modifications in a timely manner, a telecom needs to maintain firm control over its SIM card, IMSI number and MSISDN inventories. The number inventory management system presented herein tracks a telecom's inventory of SIM cards, the IMSI numbers associated with the SIM cards, and the telecom's pool of MSISDN that may be assigned to telecommunications service subscriptions (i.e. customer product instances). The number inventory system maintains state data regarding the status of SIM cards, IMSI numbers and MSISDN, as well as other number inventory parameters, in order to track the SIM cards, IMSI numbers, MSISDN and other parameters through their normal life cycles. In this way SIM cards, IMSI numbers, MSISDN and other parameters may be efficiently assigned to customer service products, and recycled as necessary if existing customers modify or cancel their service subscriptions.

Figure 3:
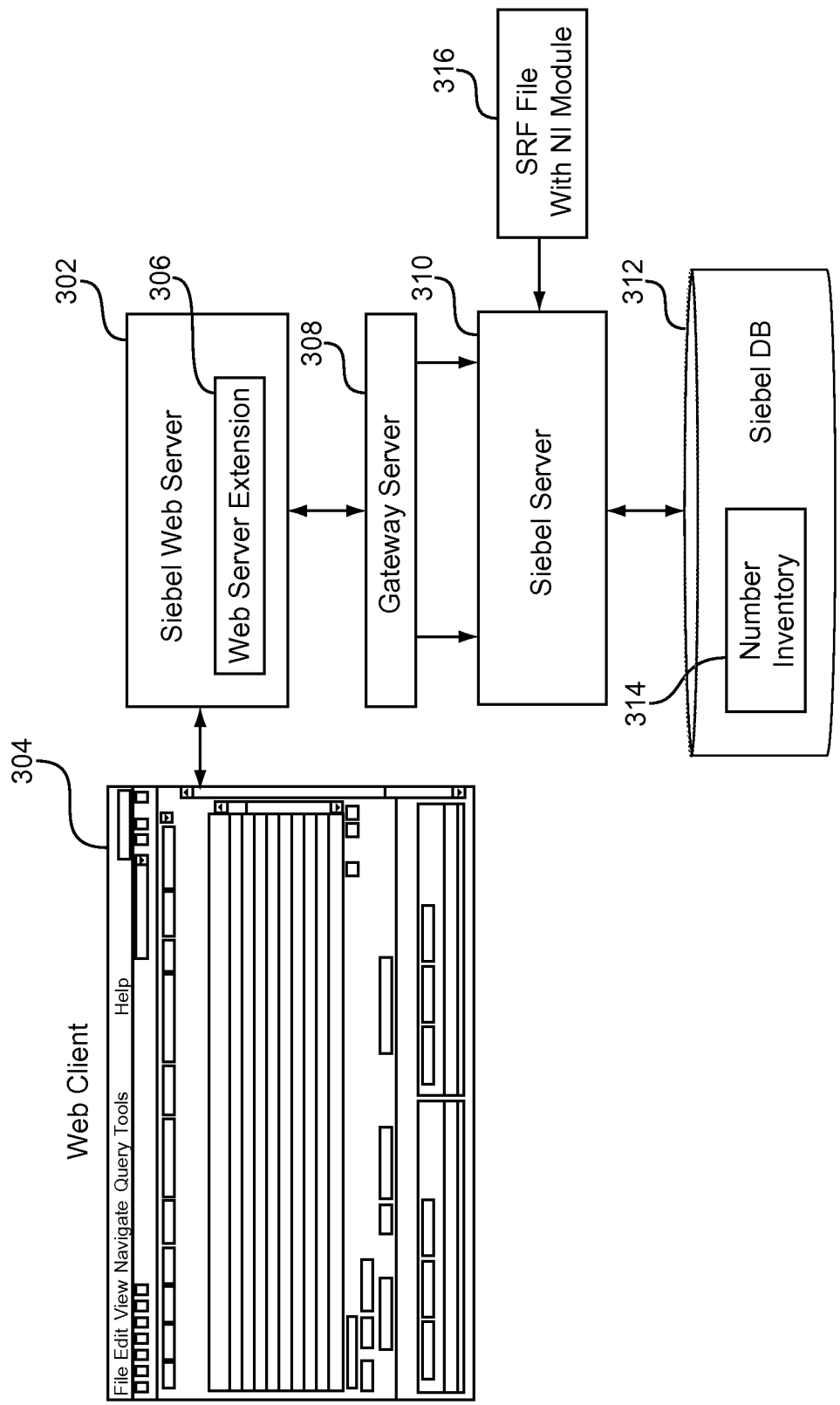
FIG. 3 is a block diagram of a customer care system incorporating a number inventory system.

The number inventory management system may be incorporated into a telecom's customer care system. A block diagram of a customer care system including a number inventory management system is shown in FIG. 3. The customer care system 300 may be a commercially available software and/or hardware package such as the Siebel eCommunication package. The customer care package includes a web server 302, and at least one web client 304. The web server 302 generates interface pages and data that may be displayed for a user by the web client 304. The web server 302 includes web server extension 306. The web server extension is a software module add-on that implements number inventory management functionality. The web server extension provides additional interface pages and input command sets for allowing a user to interact with and use the number inventory management system. For example, the additional interface pages provided by the web server extension 306 may provide screens for viewing SIM card data; opening and viewing IMSI and MSISDN ranges, viewing SIM card, IMSI number and MSISDN histories and current status, assigning SIM cards IMSI numbers and MSISDN to product orders, and the like. The web server 302 and the web server extension 306 interact with a gateway server 308. The gateway server receives all requests from the web server 302 and routes the requests to the appropriate enterprise server component, which in turn interacts with a database server 310. The database server 310 responds to commands received via the gateway 308 and interacts with a database 312 to store and retrieve data within the database 312. Number inventory data 314 are stored in special number inventory tables created in the database 312. An SRF file 316 includes program instructions for implementing the customer care application, including the instructions for implementing the number inventory module. The program instructions may be written using a custom software tool provided by the customer care package. The SRF file comprises the compiled code for implementing all of the functionalities of the customer care package, such as the graphical user interface, logical object definitions, and so forth. The number inventory module is written using the custom software tool provided by the customer care package and is included in the compiled SRF file.

Figure 4:
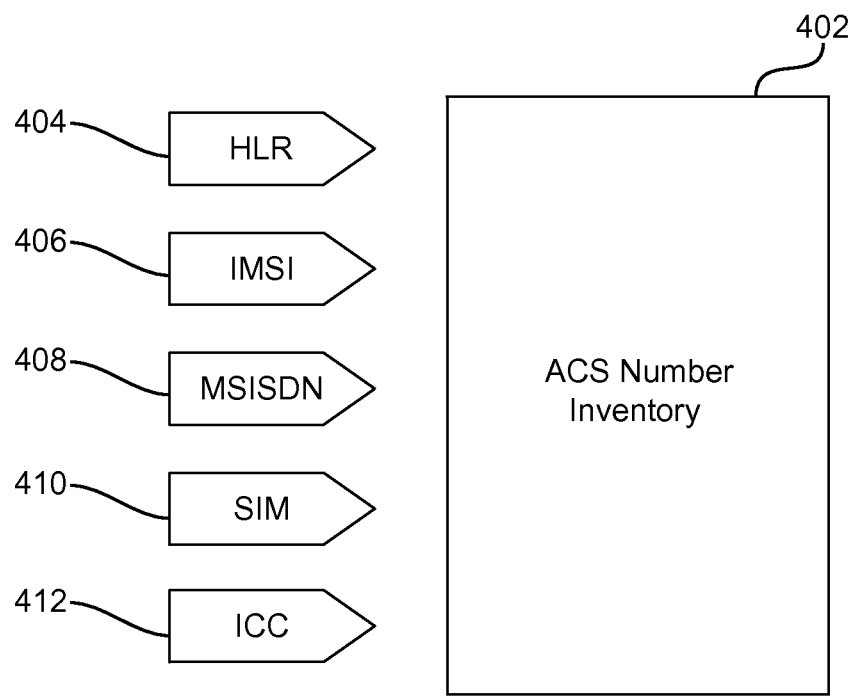
FIG. 4 is a block diagram showing the key network parameters managed by the number inventory system.

FIG. 4 is a block diagram showing the main network parameters that impact the number inventory system 402. These include Home Location Register (HLR) 404, IMSI numbers 406, MSISDN 408, SIM 410 and the ICC codes 412 printed on the integrated chip cards implementing the SIM application. The HLR 404 is a centralized database that contains details of each mobile phone subscriber authorized to use the telecom's mobile network. The HLR stores details of every SIM card issued by the telecom. The IMSI number stored on each SIM card serves as a primary key to each HLR record. As mentioned above, the IMSI number is a unique identifier associated with all GSM or UMTS mobile phone subscribers. The IMSI number is stored directly on the SIM card and is typically 15 digits long. The MSISDN 408 is the telephone number of a mobile telephone. A mobile phone may have a main MSISDN number for making and receiving telephone calls and exchanging small message service messages, and a secondary MSISDN for sending and receiving faxes, and other data communications. The SIM 410 simply refers to the subscriber identity module application running on a SIM card. Finally, the number inventory 402 relies on the integrated chip card code 412 imprinted on the SIM cards for purposes of tracking physical inventory.

Figure 5:
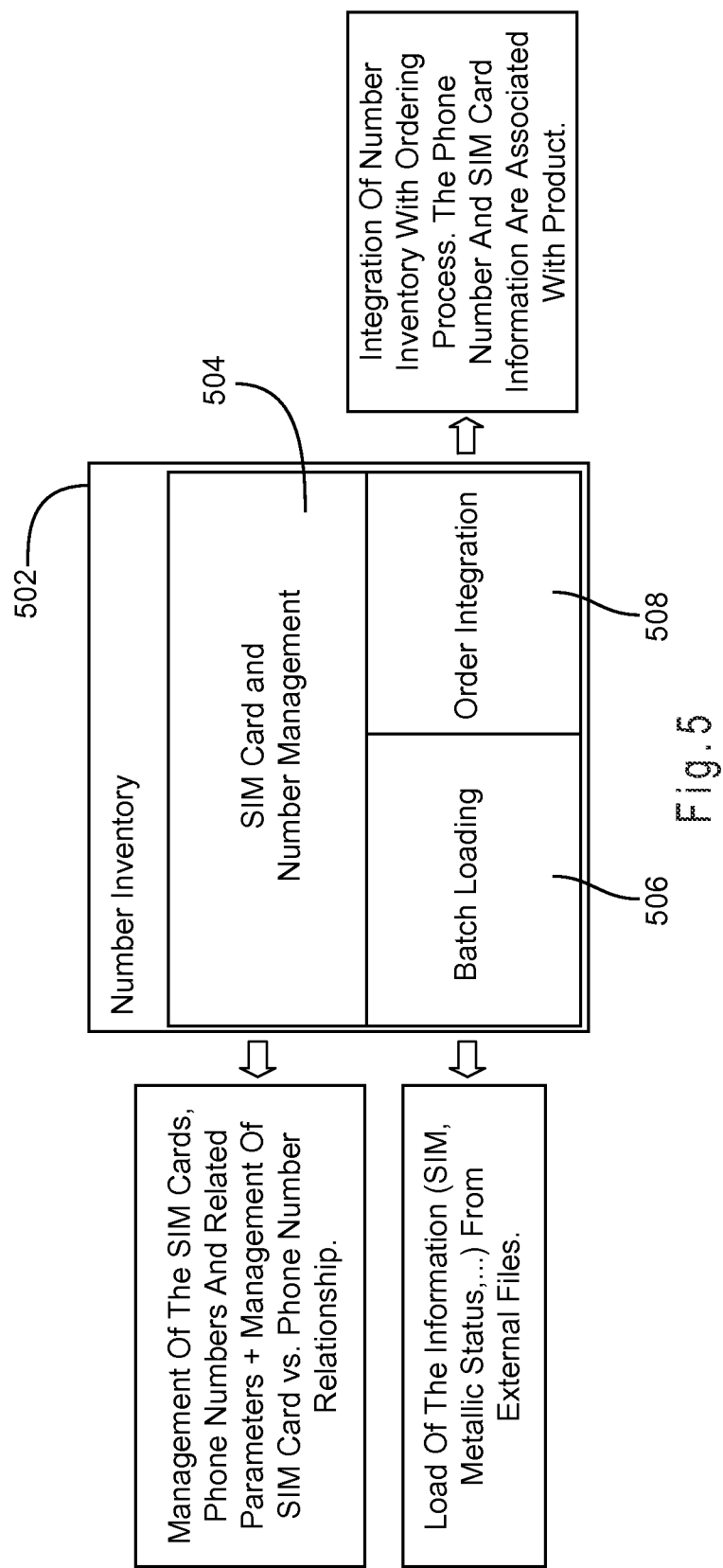
FIG. 5 is a block diagram showing main functional areas of a number inventory system.

The number inventory system may be broken down into a number of functional areas as shown in FIG. 5. The number inventory system 502 includes SIM card and number management functions 504, batch loading functions 506, and order integration functions 508. SIM card and number management functions 504 relate to management of SIM cards, IMSI numbers, MSISDN, and other SIM card related parameters. Batch loading functions 506 relate to the intake of information from external sources. For example, data relating to SIM card inventories may be imported as batch files from the SIM card supplier or manufacturer. Additional data may be batch loaded into the number inventory management system from other internal systems operated by the telecom. For example, MSISDN number classifications such as gold, silver or bronze may be created based on the desirability of various number sequences. Such classification data may be provided separately by the customer care system, order entry system, or some other system. The order integration functions 508 allow the number information management system to interact with order entry systems, assigning SIM cards and associated IMSI numbers and MSISDN to particular product instances, and so forth.

Figure 6:
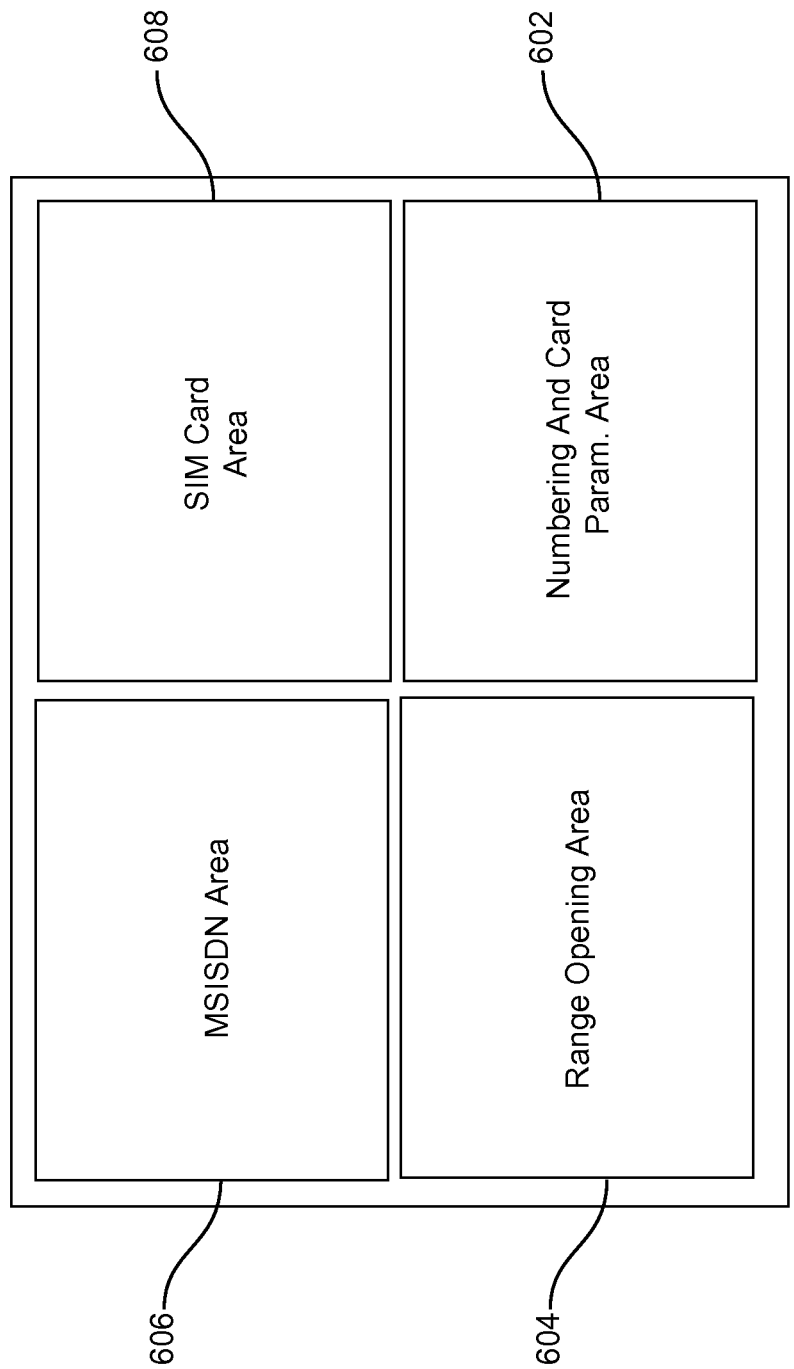
FIG. 6 is a block diagram showing logical areas of a number inventory system.

The SIM card and number management functions of the number inventory system may be broken down into four logical areas as shown in FIG. 6. The four logical areas of the number inventory are the Numbering and Card Parameter area 602, the Range Opening Area 604, the MSISDN Area 606, and the SIM Card Area 608. The Numbering and Card Parameters Area 602 is where number inventory parameters are defined. For example, different SIM card manufacturers may use different length ICC codes, different regions or countries may employ different length MSISDN numbers and so forth. The numbering and card parameters area 602 is where a telecom operator defines these parameters, and where the data structures and records embodying these parameters are stored.

Parameters defined in the Numbering and Cards Parameters Area 602 include: the MSISDN length; the MSISDN mask; MSISDN read length; IMSI number length; IMSI number read length; and HLR. The MSISDN length specifies the number of digits in the MSISDN. The MSISDN mask specifies the first several digits of the MSISDN. The specified digits form a unique code identifying the particular telecom operator. The IMSI number length specifies the number of digits in the IMSI number. The IMSI number read length specifies the expected length of the IMSI number within a data file provided by a SIM card manufacturer relating to a batch of SIM cards shipped from the manufacturer to the telecom operator. HLR is a Network database that stores all of the SIM relevant parameters (MSISDN, IMSI, etc.). This database is used by the network to unequivocally identify the SIM cards that are authorized to access the network. The Logical HLR is a representation of the HLR within the customer care package, the logical HLR stores the parameters defined for the HLR within the number inventory system.

The range opening area 604 of the number inventory system manages logical HLRs and related attributes. Attributes associated with the logical HLRs may include the service type (e.g., whether the service is a pre-activated, or post-activated service), status (e.g., whether the logical HLR is available, not available, or pending), first/last MSISDN number in the range of MSISDN numbers being opened, and first/last IMSI numbers in the range of IMSI numbers being opened. The range opening area 604 manages the MSISDN and IMSI ranges and their association to the logical HLRs.

Figure 7:
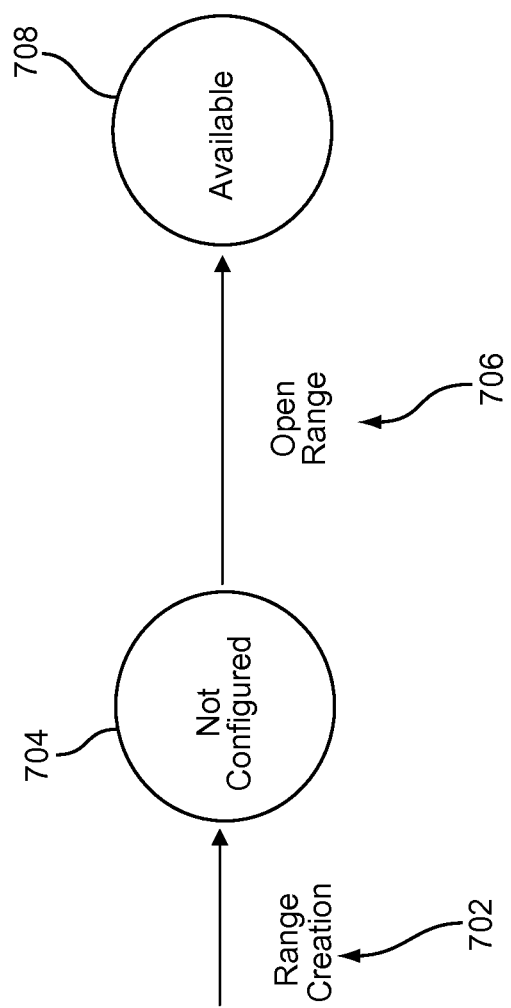
FIG. 7 is a logical HLR state diagram.

FIG. 7 is a state diagram for a logical HLR. During range creation 702, the HLR is "Not Configured" 704. Once a range is opened (including both MSISDN and IMSI ranges), the logical HLR is "Available" 708.

The MSISDN area 606 manages MSISDN numbers and related MSISDN attributes. Examples of MSISDN attributes that may be managed in the MSISDN area 606 include the logical HLR with which MSISDN in the MSISDN range are associated; MSISDN classifications such as gold, silver, and bronze; service types such as pre-activated or post-activated service; and MSISDN status.

Figure 8:
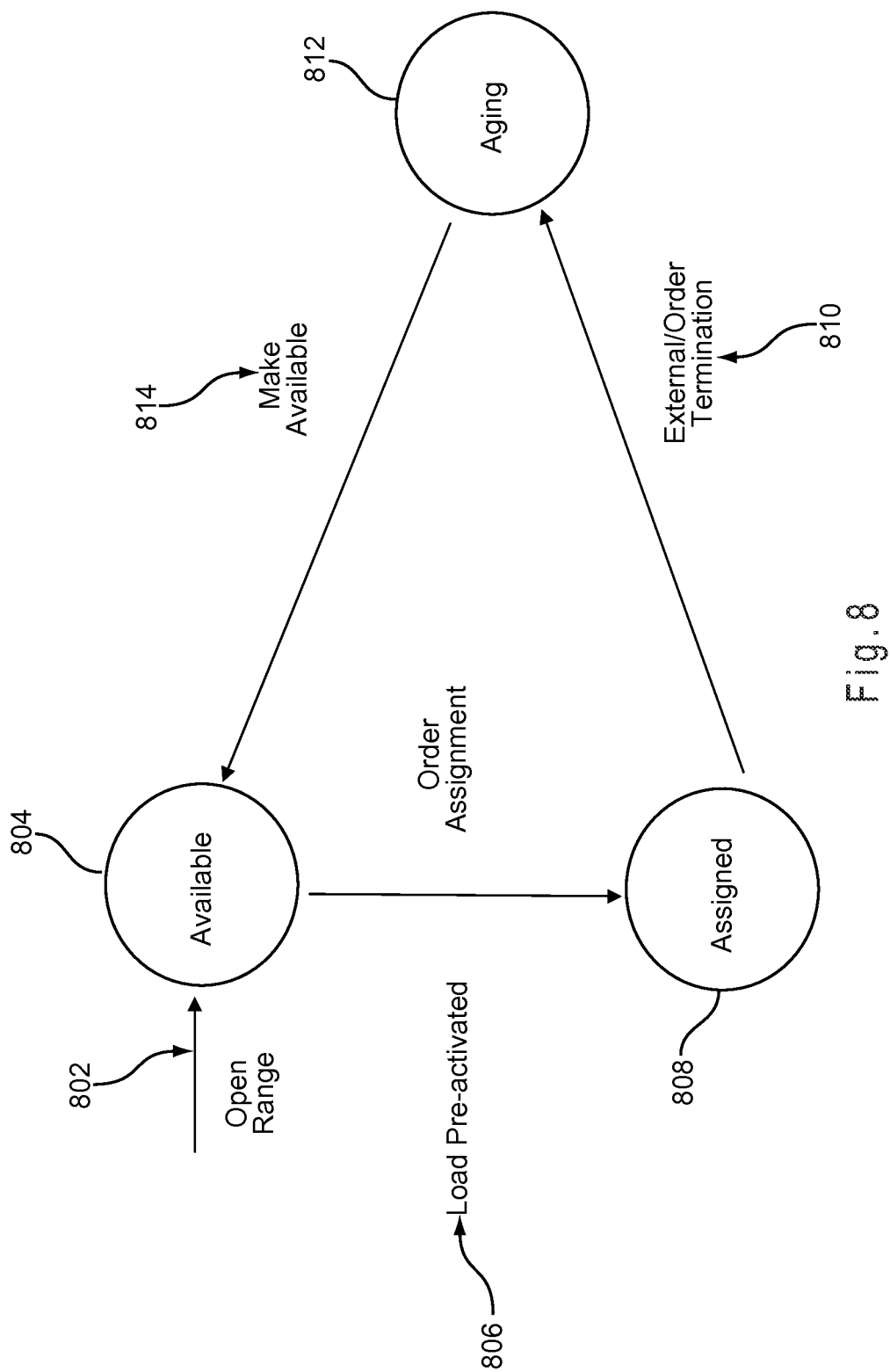
FIG. 8 is a MSISDN state diagram.

FIG. 8 is a state diagram showing the life cycle of MSISDN. At 802, a range of MSISDN is opened. Once the range is opened the MSISDN within the range become "available" 804. As will be described in more detail below, an available MSISDN number may be assigned in one of two ways. If the opened MSISDN range corresponds to MSISDN associated with pre-activated SIM cards, the MSISDN numbers within the range are assigned immediately upon the batch loading of the SIM card data into the number inventory system. Alternatively, the MSISDN numbers may be assigned to post-activated SIM cards during order fulfillment. In either case, whether through loading pre-activated SIM card data or order assignment, MSISDN are assigned at 806 and the corresponding state of a given MSISDN is changed from "Available" 804 to "Assigned" 808. The MSISDN remains in the Assigned state 808 until an external order canceling a subscriber's service is received from the telecom operator's customer care or order entry system at 810. When the external/order termination 810 is received the state of the MSISDN associated with the cancelled service changes from "Assigned" to "Aging" 812. Aging MSISDN remain dormant for a designated period of time. At the expiration of the dormant period the MSISDN may again be made available at 814, at which time the state of the MSISDN changes from "Aging" 812 back to "Available" 804.

The MSISDN area 606 may also provide additional functionalities. For example, the MSISDN area may track the history of MSISDN, providing a historical report of the associations with various IMSI numbers and corresponding SIM cards. The MSISDN area 606 may also provide an overview of the current associations between MSISDN, IMSI numbers and SIM cards. The MSISDN area 606 may also include provisions for reserving MSISDN for specific customers for use in the future. For example, a telecom's business customer may wish to reserve a large block of MSISDN having similar numeric sequences to be distributed among its employees. The reserved MSISDN numbers may be set aside or restricted in a manner such that they may only be assigned to current customer employees or employees who join the customer's organization in the future.

Finally, the SIM card area 608 manages SIM cards and related SIM card attributes. SIM card attributes managed by the SIM card area 608 may include SIM card ICC codes, the SIM card service type (e.g., pre-activated, post-activated, pre-paid, post-paid, etc.), and IMSI numbers. SIM cards may have multiple IMSI numbers, so the SIM card area may have provisions for managing multiple IMSI numbers per card. The SIM card area may also have provisions for managing attributes such as PIN-1, PIN-2, PUK-1, PUK-2, Ki-2, and K4 serial number. PIN (Personal Identification Number) is a numeric value (sometimes expressed as text using standard telephone dial mapping) that, when activated, authorizes the SIM card services. If a Customer inserts the wrong PIN number more than a predefined number of times, the SIM card may become locked preventing unauthorized use of the mobile phone in which the SIM card is installed. PUK (Personal Unlocking Key) is a personal unlocking code used in GSM mobile phones to allow a user to unlock a SIM card that has been locked. Ki/Ki2 (Key Indicator) is an encryption seed used in GSM/PCN and derivative systems call setup. The vendor code is a number associated with a physical ICC card and designates the source of the card. The price plan relates to various pricing plans the telecom operator may offer to different customers. Additional SIM card attributes may include the card type, graph profile, and card status.

Figure 9:
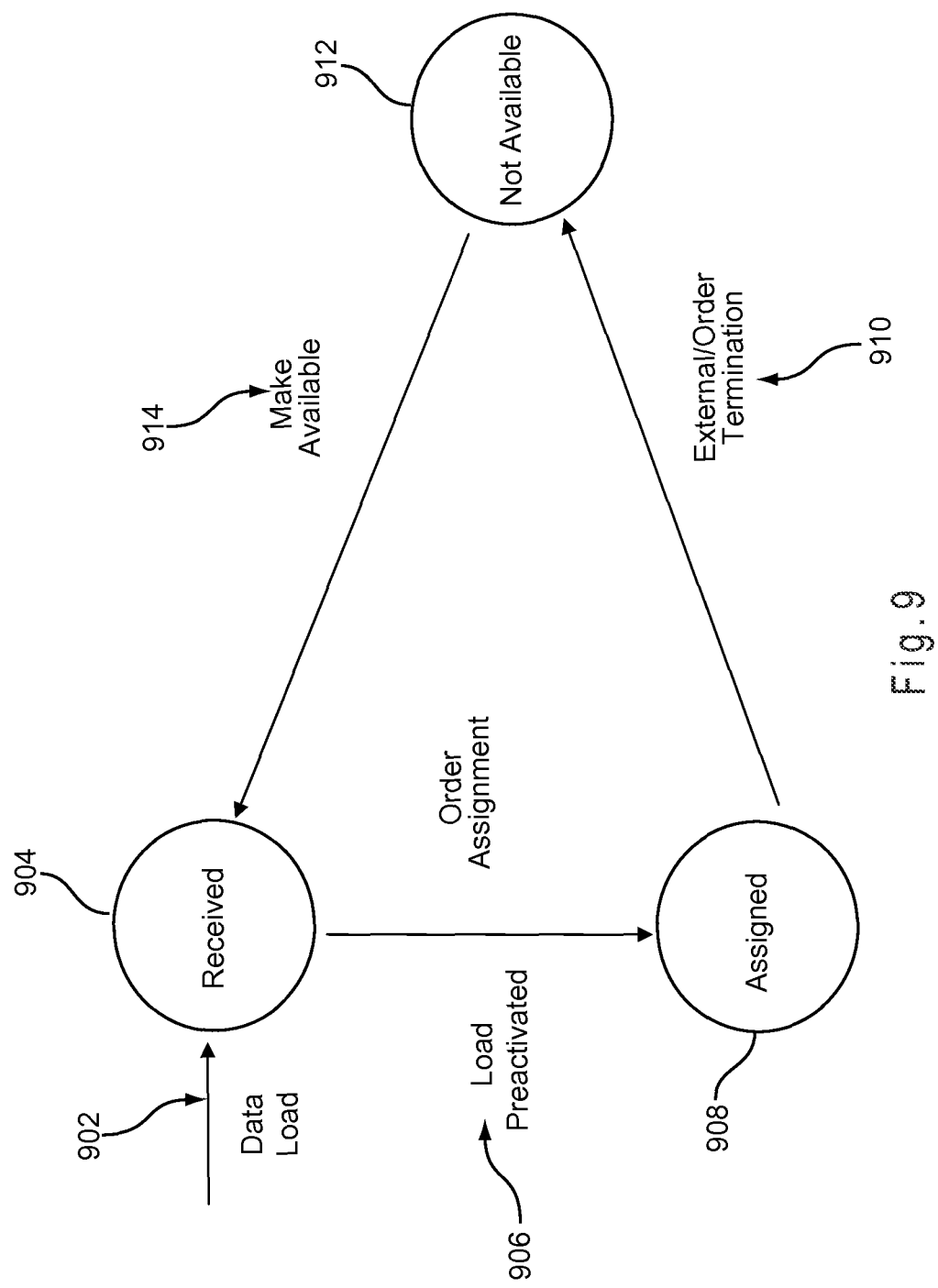
FIG. 9 is an IMSI number state diagram.

A SIM card and its associated IMSI number may take on a number of different states depending on where SIM card is in the SIM card life cycle. FIG. 9 is a state diagram showing the life cycle of IMSI numbers associated with SIM cards. At 902, data relating to a batch of SIM cards are received from a supplier. The SIM card data, including the IMSI numbers associated with the batch of SIM cards, are loaded into the number inventory system. At this point the state of the IMSI numbers associated with the SIM cards is "Received" 904. Only the IMSI numbers associated with received SIM cards may be assigned to service subscribers. There are two ways in which IMSI numbers may be assigned, depending on whether the SIM cards with which the IMSI numbers are associated are pre-activated or post-activated SIM cards. If the SIM cards are pre-activated SIM cards the IMSI numbers are already associated with MSISDN when the SIM card data are received from the SIM card supplier. Thus, the step of assigning IMSI numbers to corresponding MSISDN numbers 906 occurs when the pre-activated card data are loaded into the number management system. Alternatively, if an IMSI number is associated with a post-activated SIM card, the IMSI number may be assigned at 906 in response to a customer order for post-activated service. In either case the state of the particular IMSI number changes from "Received" 904 to "Assigned" 908. The IMSI numbers remain Assigned until the service subscription with which the SIM card is associated is terminated at 910. Once the subscription is terminated, the IMSI number becomes "Not Available" 912. The IMSI number remains in the "Not Available" state until the telecom operator decides to recycle the SIM card and the associated IMSI number by taking steps to make the IMSI number available at 914. At this point, the state of the recycled IMSI number reverts back to the "Received" state 904.

Figure 10:
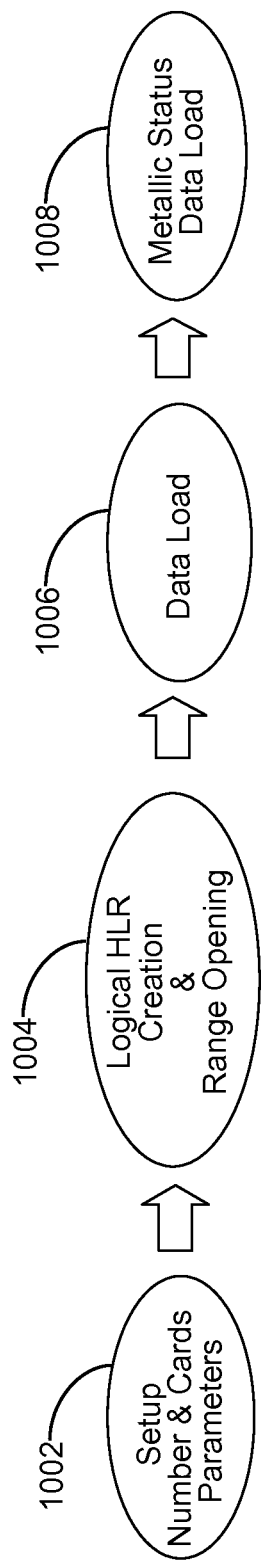
FIG. 10 is a flow chart showing a number inventory management process.

Generally speaking, there are two processes involved in managing IMSI numbers and MSISDN using the number inventory system. The first relates to establishing the inventory of IMSI and MSISDN numbers, and the second is managing the association between IMSI numbers and MSISDN numbers and their assignment to individual product instances. FIG. 10 is flowchart showing the process of building an inventory of IMSI and MSISDN numbers to be managed by a number inventory system. First, the number and cards parameters must be set up 1002. This is a preliminary activity that occurs in the numbering and card parameters area 602 (FIG. 6). As described, these activities relate to defining the length of IMSI numbers and MSISDN, establishing the MSISDN read length, the IMSI read length, and so forth. Once these basic parameters are defined they may remain set and may be applied to multiple future data loads.

Figure 11:
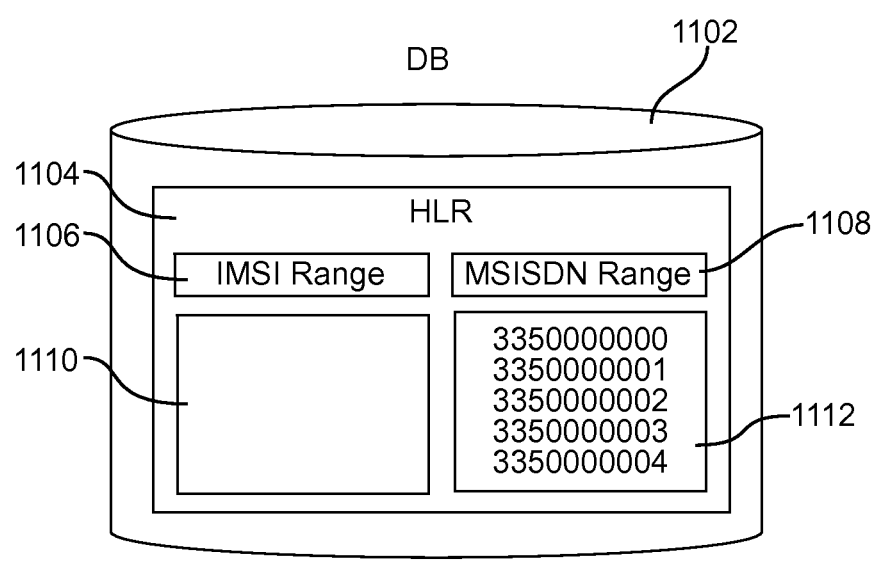
FIG. 11 is a block diagram illustrating the result of the logical HLR creation and range opening activity shown in FIG. 10.

Once the numbering and card parameters have been set up, the process moves on to the creation of a logical HLR and the opening of IMSI number and MSISDN ranges within the logical HLR at 1004. The logical HLR groups MSISDN and IMSI numbers into the same logical entity. FIG. 11 shows the outcome of the logical HLR creation and range opening 1004. The logical HLR 1104 is a database table (or series of tables) created within a telecom's customer care database 1102. The logical HLR includes an IMSI number range 1006 and an MSISDN range 1108. The MSISDN range is established by a system administrator associated with the telecom operator. The system administrator establishes the MSISDN range by specifying the first and last MSISDN in the range. The number inventory system may then populate the logical HLR 1104 with the MSISDN numbers 1112 within the specified range. The IMSI range 1106 is set up based on a "manufacturer file"

corresponding to a physical batch of SIM cards received from the SIM card manufacturer or other supplier. The manufacturer file includes SIM card data which are batch loaded into the number inventory system. For example, assume a batch of five SIM cards is to be received and that each SIM card includes two IMSI numbers IMSI-1, IMSI-2. In this case, the IMSI number range must accommodate 10 IMSI numbers. Thus, a logical memory space 1110 is established within the logical HLR for receiving the 10 IMSI numbers associated with the five SIM cards. The system administrator may define the IMSI range based on the first and last IMSI numbers included in the manufacturer file. Otherwise, the logical space created for storing the IMSI numbers may remain unpopulated as shown in FIG. 11 until the manufacturer file is actually loaded into the number inventory system. The type of service (pre-activated, post-activated) associated with the SIM cards whose data are stored in the logical HLR may be established during HLR creation and range opening 1004. Once the IMSI number and MSISDN ranges have been opened, the state of the logical HLR may be changed from "Not Configured" to "Available."

Once the logical HLR creation and range opening 1006 is complete the SIM card data are loaded at 1006. The SIM card data load is a batch process carried out by the batch loading functional area 506 (FIG. 5). The SIM card data are provided by the SIM card manufacturer or supplier in a single manufacturer file containing all of the attribute data of the SIM cards shipped to the telecom operator.

There are two different data loading processes employed by the number inventory system depending on whether the associated SIM cards relate to pre-activated service or post-activated service. The manufacturer files for pre-activated and post-activated SIM cards are similar except that the manufacturer files for pre-activated SIM cards contain an existing association between IMSI numbers and MSISDN, whereas the manufacturer files for post-activated SIM cards do not contain MSISDN information.

Figure 12:
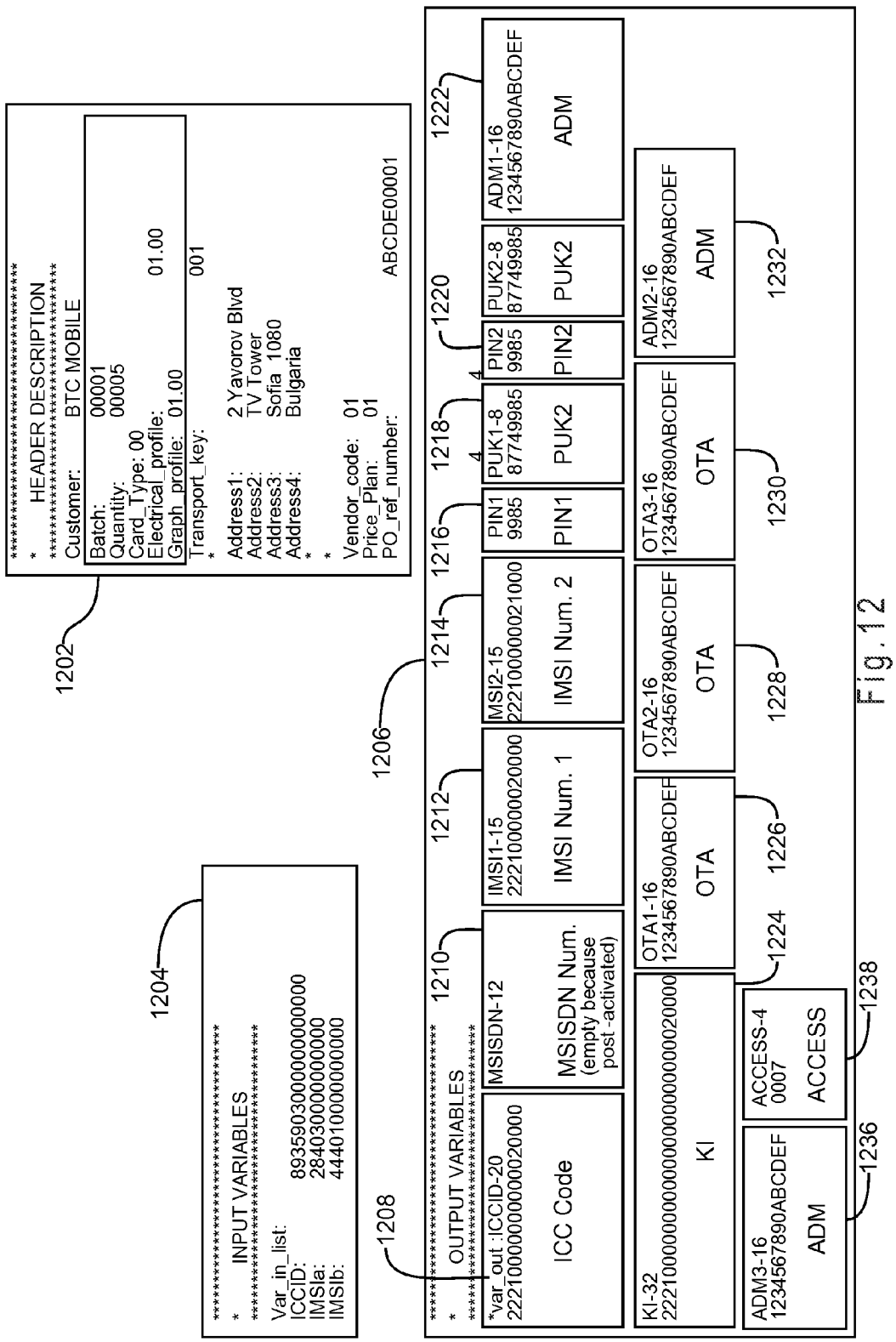
FIG. 12 is a drawing illustrating the structure and data organization of a SIM card manufacturer file.

FIG. 12 illustrates the basic structure of the manufacturer file for both pre-activated and post-activated SIM cards. The manufacturer file includes a header 1202, an input variable section 1204, and an output variable section 1206. The header section 1202 describes basic information about the data contained in the file. The data in the header may include the customer name (e.g., the telecom operator receiving the associated SIM cards); the batch number; the quantity of SIM cards contained in the batch (and thus, the number of records in the file); and the electrical profile (1.00 indicates post-activated cards, 2.00 indicates pre-activated cards).

The input variables section 1204 defines parameters for specifying ICC code and IMSI number starting values. The output variables section 1206 defines the data fields in each SIM card record within the manufacturer file, and contains the parameter values relating to the SIM cards in the received batch. The output variables include the ICC code 1208, MSISDN number 1210, IMSI number (1) 1212, IMSI number (2) 1214, PIN-1 1216, PUK-1 1218, PIN-2 1220, PUK-2 1222, an ADM-1 1224, KI 1226, OTA-1 1228, OTA-2 1230, OTA-3 1232 (OTA refers to "over-the-air provisioning," which allows a user to download and install content over a wireless network), ADM-2 1234, ADM-3 1236, and access code 1238.

FIG. 13 shows a sample manufacturer file for a batch of post-activated SIM cards. The header indicates the customer is XYZ Mobile. The data in the file relates to Batch 00001. Batch 00001 contains a quantity of five SIM cards. The electrical profile value 1.00 indicates that the cards are post-activated cards. The manufacturer file 1300 holds five records 1304, 1306, 1308, 1310, and 1312. Each record defines the attributes of one of the five SIM cards comprising Batch 00001. The first record 1304, stores an ICC code value of 22210000000000020000, corresponding to the first SIM card in Batch 1, the second stores an ICC code value of 22210000000000020001, and so forth in sequence such that the final record 1312 stores the ICC code value 22210000000000020004. Because the manufacturer file 1300 relates to post-activated SIM cards, the MSISDN field in each record is empty. The SIM cards described by the data in the manufacturer file of FIG. 13 have first IMSI numbers in the range from 222100000020000 to 222100000020004. Thus, the IMSI-1 field for the first SIM card record 1304 holds the value 222100000020000, the second SIM card record 1306 holds an IMSI-1 value 222100000020001 and so forth in sequence through the fifth SIM card record holding the IMSI-1 value 22210000002004. Similarly, the SIM cards described by the data in the manufacturer file 1300 have sequential IMSI-2 numbers in the range from 222100000021000 to 222100000021004.

FIG. 14 shows a manufacturer file 1400 for pre-activated SIM cards. The manufacturer file 1400 is substantially similar to the manufacturer file 1300 shown in FIG. 13. The manufacturer file 1400 has a header 1402, input variables 1404, and output variables 1406. The header 1402 indicates that the file corresponds to Batch 00002, having a quantity of five SIM cards. The electrical profile value is 2.00 indicating that the SIM cards described in the file are pre-activated SIM cards. The ICC code values stored in each SIM card record range in sequence from 22220000000000020000 in the first record 1408 to 22220000000000020004 in the fifth record 1416. Similarly, the IMSI-1 values range from 222200000022000 to 222200000022004 in sequence, and the IMSI-2 values sequentially range from 222200000021000- 222200000021004. The most significant difference between the manufacturer file 1400 for pre-activated SIM cards and the manufacturer file 1300 for post-activated SIM cards is that the SIM card records in the manufacturer file 1400 have values stored in the MSISDN field. The first record 1408 stores an MSISDN value of 393400003000, the second stores an MSISDN value of 393400003001 and so forth in sequence until the fifth record 1416 stores a value of 393400003004. Thus, when the telecom operator receives the manufacturer file 1400, an association already exists between the MSISDN and the IMSI-1 numbers contained in each record.

Figure 15:
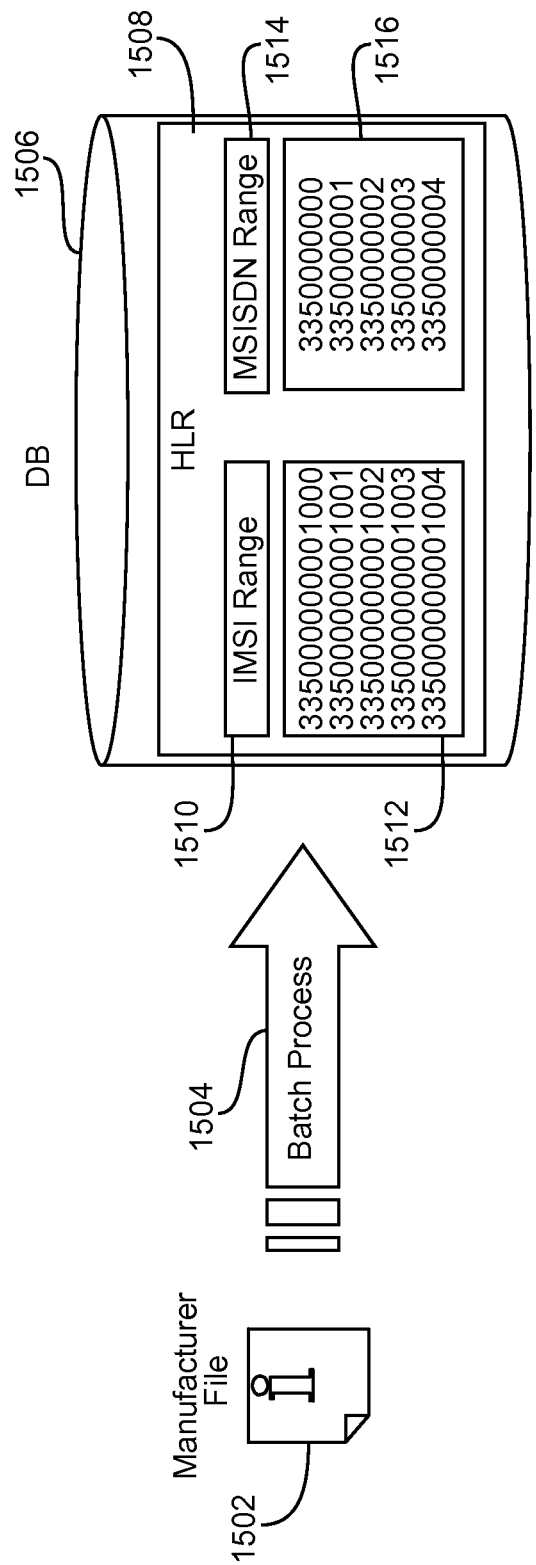
FIG. 15 is a block diagram showing the results of a post-activated SIM cards data load process.

Because of the differences between manufacturer files for post-activated and pre-activated SIM cards, there are separate processes for loading the two different types of files. The data load process for post-activated SIM cards is the simpler of the two and is depicted in FIG. 15. For post-activated SIM cards the manufacturer file 1502 is loaded into the number inventory system via a simple batch process 1504. The number inventory system extracts the IMSI numbers from the SIM card records in the manufacturer file and stores them in a logical HLR 1508 created in the customer care database 1506 for the incoming SIM card data. The individual IMSI numbers are stored in the memory space 1512 allocated for the IMSI numbers according to the previously defined IMSI range 1510. The memory space 1516 corresponding to the previously defined MSISDN range 1514 is already populated with the MSISDN numbers within the defined range. When the post-activated data load is complete there is as yet no association between the IMSI numbers and MSISDN numbers stored in the logical HLR 1508. Upon completion of the post-activated data load, the status of the IMSI numbers loaded into the logical HLR is changed to "Received," and the status of the MSISDN numbers is changed to "Available."

Post-activated services become "assets" when a customer subscribes to a service. Thus, data structures such as a customer account, billing account, service account, a service order, and the asset itself may be created and defined at the time an order for a post-activated service is processed. Pre-activated services, however, are treated differently. Each pre-activated SIM card corresponds to a pre-activated product instance. Each pre-activated product instance is treated as an asset when the pre-activated product instance is created. Thus, pre-activated services are considered assets before the services are purchased by customers. The customer care system may require various data structures to be associated with each asset. For example, the customer care system may require that a customer be defined, and a billing account, a service account, and a customer order be established for each pre-activated product instance. Since a plurality of new assets are created when pre-activated SIM card data are loaded into the number inventory system, dummy data structures are created as part of the data load process for pre-activated SIM cards. Dummy data structures are created corresponding to each SIM card record in the manufacture file. To create these dummy data structures the number inventory system provides a two-stage process for loading pre-activated SIM card data.

Figure 16:
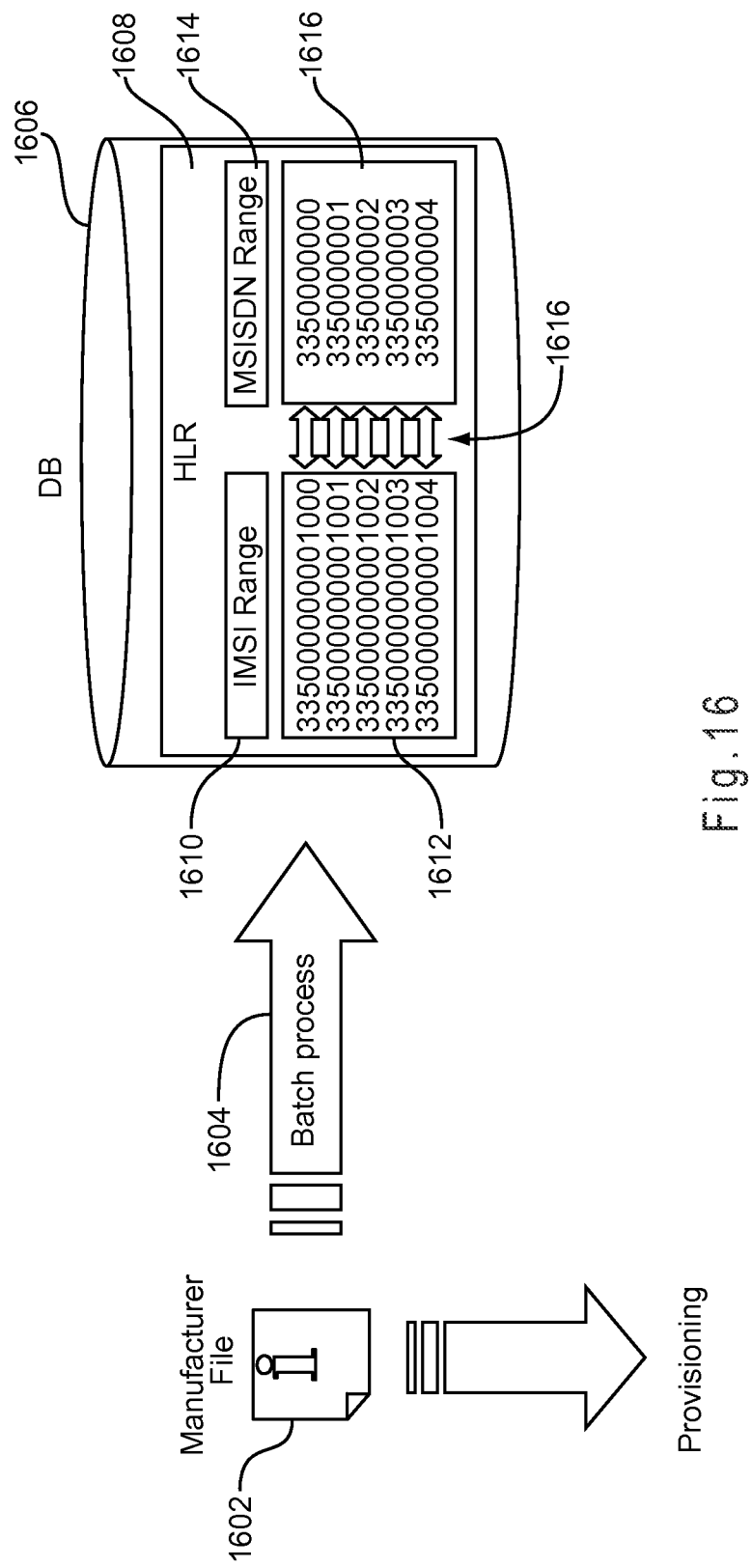
FIG. 16 is a block diagram showing the results of a first stage of a pre-activated SIM cards data load process.

The first stage of the pre-activated SIM card data load process is depicted in FIG. 16. The first stage is similar to the data load process for post-activated SIM card data. The pre-activated SIM card manufacturer file 1602 is loaded into a logical HLR 1608 created in the customer care database 1606 for receiving the pre-activated SIM card data via a simple batch process 1604. The IMSI numbers and the MSISDN are extracted from the various SIM card records in the manufacturer file and stored in the memory locations 1612 and 1616 allocated for the IMSI numbers and MSISDN numbers according to the predefined IMSI range 1610 and MSISDN range 1614, respectively. A difference between this first stage of the pre-activated SIM card data load process and the post-activated SIM card data load process is that the pre-existing associations between the IMSI numbers and MSISDN on the individual SIM cards are stored in the logical HLR 1608 as indicated by the bi-directional arrows 1618 pointing between each set of associated IMSI/MSISDN numbers. Another difference between the first stage of the pre-activated SIM card data load process and the post-activated SIM card data load process is that the manufacturer file 1602 is also forwarded to the telecom operator's provisioning system at 1620.

Figure 17:
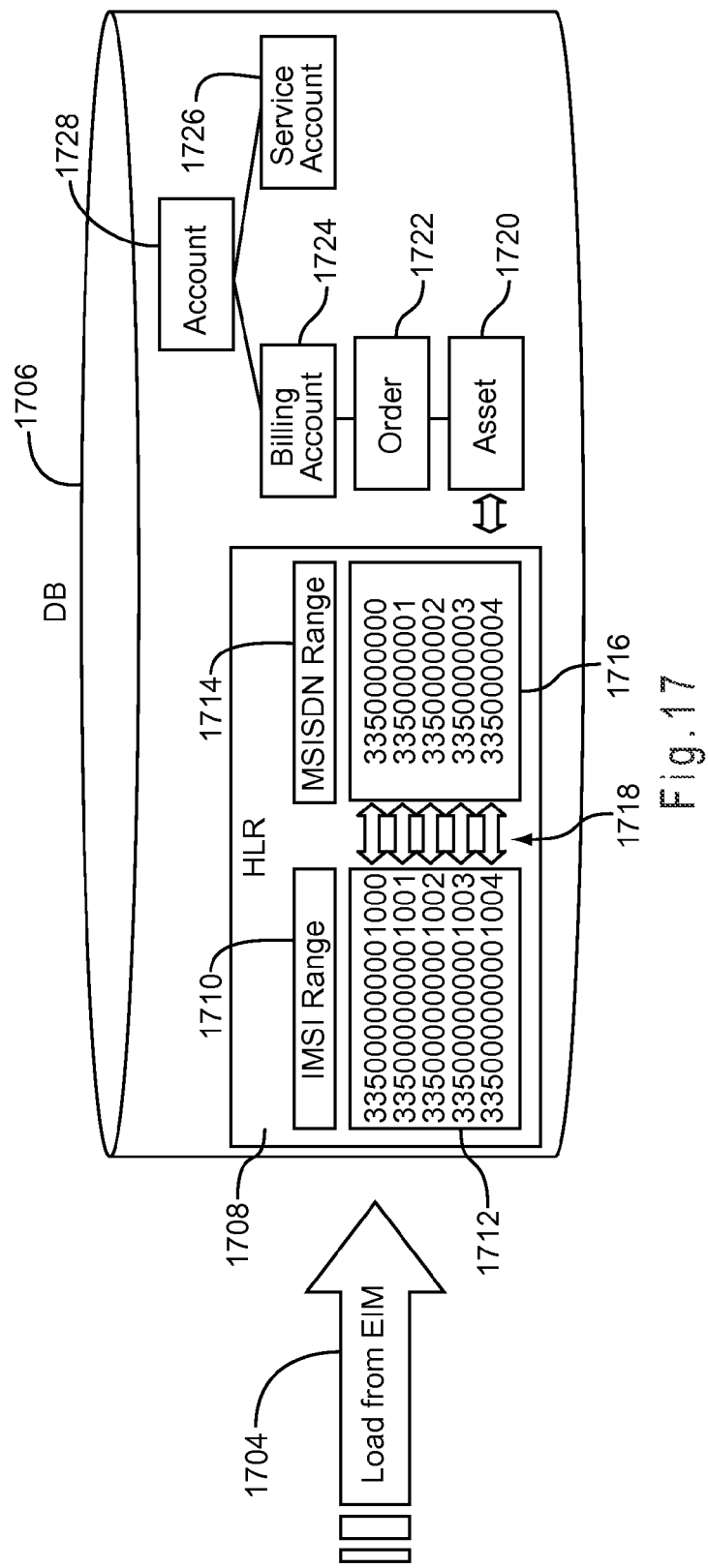
FIG. 17 is a block diagram showing the results of a second stage of a pre-activated SIM cards data load process.

The second stage of the pre-activated SIM card data load process relates to creating the assets and associated accounts corresponding to the pre-activated SIM cards whose data are being loaded from the manufacturer file. Dummy data structures are created corresponding to the records in the manufacturer's file. The dummy data structures comprise various accounts and other data objects created by the telecom operator's enterprise information management systems (EIM) to support the new assets. The dummy data structures created during the pre-activated SIM card data load process are the same data objects that are created when a post-activated product is actually sold to a customer. FIG. 17 shows the second stage of the pre-activated SIM card data load process. EIM data 1704 including the dummy data structures are loaded into the customer care database 1706. The data structures including an account 1728, a billing account 1724, a service account 1726, an order 1722; and an asset 1720. Data structures are associated with each record in the logical HLR record, (i.e. with each pair of associated IMSI and MSISDN in the logical HLR 1708). When the dummy data structures are created they do not hold any real data. However, the dummy data structures may be altered or overwritten when the corresponding products are actually sold, adding actual customer account, service order, and billing information.

Returning briefly to FIG. 10, a final step in establishing a number inventory comprises loading number classification data 1008. For example, it may be desirable to classify MSISDN numbers based on various characteristics of the individual numbers. Numbers having sequences or patterns that make them easier to remember may be given a higher classification or rating than MSISDN comprising seemingly random sequences of digits. Highly coveted numbers might be classified as gold or platinum, or they may be given an alphanumeric designation such as A1, or the like. Second tier number sequences may be given lesser classifications such as silver or bronze, A2, A3 or B1, and so forth. For purposes of the remaining description the designations normal, bronze, silver, gold, and platinum will be used. Collectively, these will be referred to as metallic designations.

Figure 18:
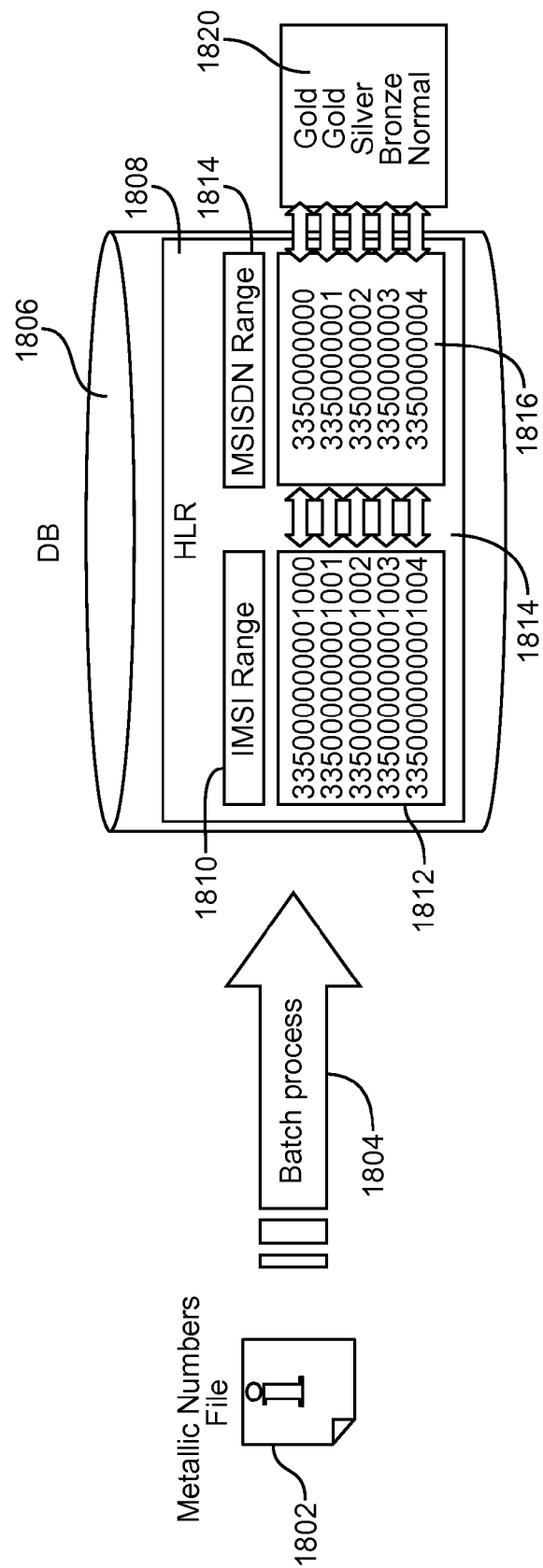
FIG. 18 is a block diagram showing the results of a metallic number classification process.

Metallic status designations are loaded into the logical HLR via a separate batch process. Prior to loading the metallic status data, the MSISDN numbers in the logical HLR have the designation "normal." They remain "normal" unless their status is changed by the metallic status data load. The metallic status data load is performed after the SIM card data load. FIG. 18 shows the metallic data load process. A metallic numbers file 1802 is loaded into the logical HLR 1808 by a simple batch process 1804. The metallic numbers file 1802 includes associations between the MSISDN numbers and the various metallic designations. After the metallic numbers file has been loaded into the logical HLR, the logical HLR stores the associations between the various metallic designations and the MSISDN numbers within the MSISDN range 1814 along with the associations between MSISDN numbers 1816 and the IMSI numbers 1812 within the IMSI range 1810.

Once the MSISDN range has been established, the manufacturer file has been loaded, and the number classification data have been loaded, the data stored in the logical HLR may be integrated with the telecom operator's order management system. Two scenarios must be considered. The first relates to processing orders for post-activated SIM cards and the second relates to processing orders for pre-activated SIM cards.

In the post-activated scenario the association between an MSISDN number and an IMSI number is created as part of the standard ordering process during the product configuration. Typically a telecom operator's order processing systems are capable of processing three types of orders for post-activated services: installations (adding new services); cancellations (terminating subscriptions and disconnecting services); and service modifications (replacing SIM cards, changing MSISDN number). Each type of order touches the number inventory system.

Typically a telecom operator's order entry or customer care system drives the processes invoked when customers add, change or terminate services. The creation of a customer order initiates processes in the telecom operator's billing system, provisioning system, and any other internal systems the telecom operator has established for implementing and accounting for service subscriptions. For example, to support a new customer adding a new service a number of actions must be taken by the telecom operator's systems. A customer entity must be created in the customer care system, a billing account must be created in the billing system, and the particular service subscribed to by the customer must be provisioned on the telecom operator's network equipment. These tasks and others may be initiated when an installation order is submitted. The installation order identifies the type of service to be added, and includes the necessary information about the customer. The order may be further customized by selecting an available MISISDN number and a SIM card (with an associated IMSI number) from a list of available MISISDN numbers and a list of available SIM card that are displayed via the number inventory user interface. The number inventory system creates the association between the selected MSISDN number and the IMSI number of the selected SIM card in response to the submitted order. The number inventory changes the status of the selected MSISDN number and the selected IMSI number to "assigned."

When a customer chooses to modify an existing subscription the customer care system initiates processes similar to those initiated when a new service subscription is created. However, rather than creating a new customer entity, billing account, and so forth, existing data structures may be modified as necessary to accommodate the desired changes to the user's subscription. Examples of subscription modifications that impact the number inventory system include replacing a user's SIM card (with a corresponding change in the IMSI number associated with the new card) or changing the customers MSISDN number. To implement such changes a new SIM card or new MSISDN number may be selected from separate lists of available SIM cards and MSISDN numbers. Again, the number inventory system creates the new association between the new IMSI number and/or the new MSISDN number when the order is submitted. The number inventory system changes the status of the new IMSI number and/or MSISDN from "available" to "assigned." If the customer is changing his or her MSISDN, the number inventory system changes the status of the old MSISDN from "assigned" to "aging." If the customer is replacing a SIM card, the number inventory system changes the status of the old IMSI number from "assigned" to "not available."

Finally, when a customer decides to terminate a subscription the customer must be identified within the customer care system. The billing account must be selected and modified accordingly, and the appropriate asset must be identified and terminated. These actions are driven by a termination order initiated by the customer care system. The number inventory system responds to a termination order by changing the status of the MSISDN associated with the terminated asset to "aging," and changing the status of the IMSI number associated with the SIM card associated with the cancelled service to "not available."

Next we turn to integrating the number inventory system with orders for post-activated SIM cards. Recall that when pre-activated SIM card data are loaded into the number inventory logical HLR database, the association between IMSI numbers and MSISDN numbers already exists and dummy data structures have been created for each HLR record. There are three variations of the pre-activated order process to consider. The first relates to situations in which the customer purchasing a pre-activated service is unknown and wishes to remain anonymous. The second relates to a new customer who was not previously registered, but who wishes to be identified. The final situation is when an existing customer who has already been identified purchases a pre-activated service.

In the first case, when an anonymous customer purchases the pre-activated service and wishes to remain anonymous very little processing is required. By definition the service is pre-activated. The association between the IMSI number stored on the SIM card and a corresponding MSISDN has already been created. The only action required to activate the service is to record that the pre-activated service has been sold. The dummy data structures created when the asset was configured need not be overwritten due to the desired anonymity of the customer. The product is paid for upfront and no real billing account information is necessary.

When a new customer purchases a pre-activated service but does not wish to remain anonymous, however, additional steps are necessary. Again, the pre-activated asset must be recorded as sold. However, in addition to marking the asset as sold, the number inventory system must overwrite the dummy data structures with real customer data. Thus customer data, billing account data, and the like must be written into the dummy data structures.

Finally, when an existing customer purchases a pre-activated service, the customer may be selected from a list of existing customers, the billing account may be selected from a list of existing billing accounts, and an existing service account may be selected from a list of existing service accounts. The number inventory system may then link the asset to the selected customer, and the selected billing and service accounts and record the pre-activated asset as sold. After the asset has been assigned, the status of the asset may be changed from "pre-active" to "active."

The number inventory system manages the inventory of MSISDN available to the telecom operators. The number inventory system also manages the telecom operator's SIM card inventory and the IMSI numbers associated with the various SIM cards. The number inventory system manages, and when necessary creates, the associations between IMSI numbers and MSISDN numbers corresponding to telecommunications product instances. The number inventory system stores MSISDN classification data and integrates number management functions with other service order processing systems, providing number management functions in a seamless integrated manner.

While various embodiments of the system have been described, it will be apparent to those of ordinary skill in the art that many more embodiments and implementations are possible and fall within the scope of the following claims. Accordingly, the system not to be restricted except in light of the attached claims and their equivalents.

We claim:

1. A method of managing MSISDN and IMSI numbers associated with post-activated SIM cards, the method comprising:
   creating a logical HLR in a number inventory database;
   receiving, from an operator, a first MSISDN specified by the operator;
   receiving, from the operator, a second MSISDN specified by the operator;
   in response to receiving the first and the second MSISDN, opening a range of MSISDNs within the logical HLR, wherein the range of MSISDNs corresponds to a sequence of MSISDNs that starts with the first MSISDN and ends with the second MSISDN;
   opening a range of IMSI numbers within the logical HLR, the range of IMSI numbers corresponding to IMSI numbers stored on individual SIM cards in a plurality of SIM cards, wherein IMSI numbers in the range of IMSI numbers are unrelated to MSISDNs in the range of MSISDNs;

receiving data associated with the plurality of SIM cards including IMSI numbers associated with the individual SIM cards of the plurality;

receiving an order for a post-activated mobile telecommunications product;

selecting a SIM card for fulfilling the order, the selected SIM card storing an associated IMSI number;

selecting an MSISDN to be associated with the post-activated telecommunications product from the opened range of MSISDN; and associating, in the logical HLR, the selected MSISDN and the IMSI of the selected SIM card;

changing state data associated with the selected MSISDN and the IMSI number associated with the selected SIM card indicating the MSISDN and the selected IMSI number associated with the selected SIM card have been assigned to a product instance; and receiving MSISDN classification data and classifying MSISDN within the opened range of MSISDN according to characteristics of the MSISDN, and wherein selecting an MSISDN from the opened range of MSISDN comprises selecting an MSISDN of a classification.

2. The method of managing MSISDN and IMSI numbers associated with post-activated SIM cards of claim 1, wherein receiving data associated with the plurality of SIM cards comprise loading a plurality file of SIM card data provided by a supplier of corresponding plurality of SIM cards.

3. The method of managing MSISDN and IMSI numbers associated with post-activated SIM cards of claim 1, further comprising receiving an order to cancel a post-activated telecommunications product, and changing the state data of the MSISDN and IMSI number associated with the telecommunications product instance to a state indicating that the MSISDN and IMSI number are no longer assigned.

4. The method of managing MSISDN and IMSI numbers associated with post-activated SIM cards of claim 1, further comprising receiving an order to modify telecommunications product instance by changing a previously selected MSISDN to a Previously presented MSISDN, changing the state of the previously selected MSISDN from the state indicating that the previously selected MSISDN is assigned to a product instance to a state indicating that the previously selected MSISDN is no longer assigned, selecting the Previously presented MSISDN from the opened range of MSISDN, and changing state data of the Previously presented MSISDN from a state indicating that the Previously presented MSISDN is available to a state indicating that the Previously presented MSISDN is assigned.

5. The method of managing MSISDN and IMSI numbers associated with post-activated SIM cards of claim 1, further comprising receiving an order to modify a telecommunications product instance by associating a Previously presented SIM card with the telecommunications product, changing the state of the IMSI number associated with the previously selected SIM card from the state indicating that the IMSI number associated with the previously selected SIM card is assigned to a telecommunications product instance to a state indicating that the IMSI number associated with the previously selected SIM card is no longer assigned, selecting a Previously presented SIM card storing a Previously presented IMSI number, and changing the state of the Previously presented IMSI number from a state indicating that the Previously presented IMSI number is available to a state indicating that the Previously presented IMSI number is assigned.

6. A method of managing MSISDN and IMSI numbers associated with activated SIM cards, the method comprising:

creating a logical HLR in a number inventory database;

receiving, from an operator, a first MSISDN specified by the operator;

receiving, from the operator, a second MSISDN specified by the operator;

in response to receiving the first and the second MSISDN, opening a range of MSISDN within the logical HLR, wherein the range of MSISDN corresponds to a sequence of MSISDN that starts with the first MSISDN and ends with the second MSISDN;

opening a range of IMSI numbers within the logical HLR, wherein IMSI numbers in the range of IMSI numbers are unrelated MSISDNs in the range of MSISDNs;

receiving data associated with a plurality of SIM cards, wherein each individual SIM cards has stored thereon both an IMSI number and an MSISDN;

storing the IMSI number and MSISDN stored on individual SIM cards in the logical HLR, and storing an association between the IMSI number and MSISDN stored on the same SIM card;

creating dummy data structures corresponding to the individual SIM cards in the plurality of pre-activated SIM cards, a telecommunications product comprising the pre-activated SIM cards and corresponding dummy data structures defining an asset; and overwriting dummy variables within the dummy data structures with customer data corresponding to a customer purchasing the asset.

7. The method of managing MSISDN and IMSI numbers associated with pre-activated SIM cards of claim 6, wherein the dummy data structures define at least one of: an account; a billing account; a service account; an order; and an asset.

8. The method of managing MSISDN and IMSI numbers associated with the pre-activated SIM cards of claim 6, further comprising selling the asset defined by the telecommunication product comprising the pre-activated SIM card and corresponding data structures, and storing data indicating that the asset has been sold.

9. The method of managing MSISDN and IMSI numbers associated with pre-activated SIM cards of claim 8, further comprising overwriting dummy variables within the dummy data structures with customer data corresponding to an existing customer.

10. The method of managing MSISDN and MSISDN numbers associated with the pre-activated SIM cards of claim 8, further comprising changing state data associated with the asset from a state indicating that the asset was pre-active to a state indicating the asset is active.

11. A method of managing MSISDN and IMSI numbers associated with post-activated SIM cards, the method comprising:

providing a logical HLR in a number inventory database, the logical HLR including a range of MSISDNs, wherein the range of MSISDN corresponds to a sequence of MSISDN that starts with a first MSISDN specified by an operator and ends with a second MSISDN specified by the operator, and a range of IMSI numbers, wherein each IMSI in the range of IMSI numbers corresponds to an IMSI number stored on an individual SIM, wherein IMSI numbers in the range of IMSI numbers are unrelated MSISDNs in the range of MSISDNs when opened in the HLR, and wherein the logical HLR defines a state, which in turn defines a relationship between at least one MSISDN and an IMSI that is associated with a SIM subsequent to activation of the SIM, wherein the state indicates the MSISDN as being assigned to the SIM associated with the IMSI;

receiving a request to cancel a subscriber service associated with the SIM; and changing the state to indicate the relationship between the MSISDN and the SIM associated with the IMSI as being dormant and no longer active; and defining a service type associated with a logical HLR data entry, a first and last MSISDN associated with a logical HLR data entry, and a first and last IMSI number associated with the logical HLR data entry, and a status of the logical HLR.

12. The method according to claim 11, wherein the during the dormant state, the MSISDN cannot be assigned to a second IMSI associate with a second SIM.

13. The method according to claim 11, further comprising changing the state to indicate that the MSISDN is available to be assigned after a pre-determined amount of time.

14. The method according to claim 11, further comprising generating a historical report that defines past relationships between an MSISDN and one or more IMSIs, each of which being associated with a different SIM.

15. The method according to claim 11, wherein the number inventory database is managed by a database server that includes numbering and card parameter software through which parameters associated with Subscriber Identity Module (SIM) cards, International Mobile Subscribe Identity (IMSI) numbers, and Mobile Station International Subscriber Directory Numbers (MSISDN) may be defined.

16. The method according to claim 15, wherein parameters associated with SIM cards, IMSI numbers, and MSISDN include at least one of: an MSISDN length; an MSISDN mask; an MSISDN read length; an IMSI number length, or an IMSI number read length.

17. The method according to claim 15, wherein the database server includes range opening software through which logical Home Location Register (HLR) data entities may be defined, and IMSI number ranges and MSISDN ranges may be associated with logical HLR data entries.

* * * * *

UNITED STATES PATENT AND TRADEMARK OFFICE
CERTIFICATE OF CORRECTION

PATENT NO. : 9,596,595 B2
APPLICATION NO. : 14/163875
DATED : March 14, 2017
INVENTOR(S) : Marina Papili and Chiara Cundari It is certified that error appears in the above-identified patent and that said Letters Patent is hereby corrected as shown below:

In the Claims

Column 16, Line 50: "...managing MSISDN and MSISDN..." should be "...managing MSISDN and IMSI..."

Signed and Sealed this
Eighth Day of January, 2019

Andrei Iancu
*Director of the United States Patent and Trademark Office*